United States Patent [19]

Komoda

[11] Patent Number: 5,780,183

[45] Date of Patent: Jul. 14, 1998

[54] AGENT FOR MAINTAINING AND RECOVERING THE FUNCTION OF LEAD STORAGE BATTERY AND ELECTROLYTE FOR LEAD STORAGE BATTERY USING THE SAME

[75] Inventor: Katsuichi Komoda, Toyonaka, Japan

[73] Assignees: Kyowa Hakko Kogyo Co., Ltd., Tokyo; K-TEC Co., Ltd., Osaka, both of Japan

[21] Appl. No.: 744,285

[22] Filed: Nov. 6, 1996

Related U.S. Application Data

[63] Continuation of Ser. No. 378,477, Jan. 26, 1995, Pat. No. 5,738,956.

[30] Foreign Application Priority Data

Jan. 28, 1994 [JP] Japan ........................... 6-8090

[51] Int. Cl.$^6$ ........................................... H01M 10/08
[52] U.S. Cl. .................................. 429/198; 429/205
[58] Field of Search .......................... 429/198, 205

[56] References Cited

U.S. PATENT DOCUMENTS 375,441  12/1887  Cox .
1,685,674  9/1928  Kelleher .
1,685,675  9/1928  Kelleher .
4,064,324  12/1977  Eustace ........................... 429/198 X
4,377,625  3/1983  Parsen et al. ..................... 429/198
4,617,244  10/1986  Greene ............................. 429/203

FOREIGN PATENT DOCUMENTS 1552598  1/1968  France .
52-72428  6/1977  Japan .
53-10827  1/1978  Japan .
54-007134  1/1979  Japan .
59-194267  11/1984  Japan .
59-194367  11/1984  Japan .
63-19771  1/1988  Japan .
268828  1/1928  United Kingdom .

*Primary Examiner*—Stephen Kalafut
*Attorney, Agent, or Firm*—Loeb & Loeb LLP

[57] ABSTRACT

The present invention relates to an agent for maintaining and recovering the function of a lead storage battery, comprising as active ingredients a metal sulfate and at least one of an amino acid and a salt thereof, as well as an electrolyte for use in a lead storage battery comprising the above agent and a basal electrolyte. According to the present invention, there is provided a highly effective agent or electrolyte for maintaining the function of a lead storage battery over a long period and recovering the function of a lead storage battery whose storage capacity has been lowered.

12 Claims, 2 Drawing Sheets

Time (hr.)

Time (hr.)

5,780,183

1

AGENT FOR MAINTAINING AND RECOVERING THE FUNCTION OF LEAD STORAGE BATTERY AND ELECTROLYTE FOR LEAD STORAGE BATTERY USING THE SAME

This is a continuation of U.S. patent application Ser. No. 08/378,477 filed Jan. 26, 1995, now U.S. Pat. No. 5,738,956.

BACKGROUND OF THE INVENTION

1. Field of the Invention

The present invention relates to an agent for maintaining the function of a lead storage battery over a long period, recovering the function of a lead storage battery whose storage capacity has been lowered and improving the efficiency of the storing of electrical charge therein, and an electrolyte comprising the agent.

2. Description of the Prior Art

With respect to those methods for maintaining or recovering the function of a lead storage battery, there are known a method wherein water-soluble vitamins are added to the electrolyte (Japanese Unexamined Patent Publications Nos. 52-72428 and 54-7134), a method wherein an organic acid, such as dicarboxylic acid or tricarboxylic acid, is added to the electrolyte (Japanese Unexamined Patent Publication No. 53-10827), and a method wherein bis-β-ethylcarboxylate germanium sesquioxide is added to the electrolyte (Japanese Unexamined Patent Publications Nos. 59-194367 and 63-19771).

OBJECTS AND SUMMARY OF THE INVENTION

It is an object of the present invention to provide an agent for maintaining and recovering the function of a lead storage battery, which agent is able to maintain the storage capacity thereof and also recover and improve the charging effect thereof at the time of charging. It is another object of the present invention to provide an electrolyte for a lead storage battery comprising the agent.

In one aspect of the present invention, there is provided an agent for maintaining and recovering the function of a lead storage battery, comprising as active ingredients a metal sulfate and at least one of an amino acid and a salt thereof. In another aspect of the present invention, there is provided an electrolyte for a lead storage battery which is obtained by adding the agent to a basal electrolyte.

Examples of the metal sulfates include light metal sulfates such as sodium sulfate, magnesium sulfate, aluminium sulfate and the like, and heavy metal sulfates such as cobalt sulfate, barium sulfate, manganese sulfate, iron (II) sulfate, iron (III) sulfate and the like.

Any amino acid may be used in the present invention so long as it has a carboxylic group and an amino group in one molecule and produces the effect of the present invention. Preferably, an α-amino acid is used. More preferably, an acidic amino acid, such as glutamic acid, aspartic acid or the like, is used. These amino acids may be in the form of a metal salt, such as a sodium salt, potassium salt, magnesium salt, calcium salt, aluminium salt or the like. Also, these amino acids may be in L-form, D-form or mixture thereof.

According to the present invention, the combining ratios of a metal sulfate and at least one of an amino acid and a salt thereof in the agent for maintaining and recovering the function of a lead storage battery are preferably from 5 to 95 weight parts for the metal sulfate and from 5 to 95 weight

2 parts for the amino acid and a salt thereof. When the ratio of the metal sulfate is less than 5 weight parts, it is difficult for the cathode plate of a lead storage battery to absorb the gas generated from the anode plate at the final stage of charging. On the other hand, when the ratio of the metal sulfate is more than 95 weight parts, gas generation and absorption reactions in the anode and cathode plates take place less easily. More preferably, the combining ratio of the metal sulfate is from 10 to 60 weight parts and the ratio of at least one of the amino acid and the salt thereof is from 40 to 90 weight parts.

The agent of the present invention for maintaining and recovering the function of a lead storage battery may further comprise a metal carbonate to improve the effect on maintaining and recovering the function still more.

Examples of the metal carbonates to be used for the above purpose include alkali metal salts, such as sodium carbonate, potassium hydrogencarbonate and the like, and alkaline earth metal salts, such as magnesium carbonate and the like. The ratio of a metal carbonate to at least one of an amino acid and a salt thereof is usually from 0.1% to 80% by weight, preferably from 1% to 70% by weight.

The agent of the present invention for maintaining and recovering the function of a lead storage battery may further comprise a known agent for maintaining and recovering the function of a lead storage battery, such as vitamin C, citric acid or the like, to improve the effect on maintaining and recovering the function still more.

The agent of the present invention for maintaining and recovering the function of a lead storage battery may be used in either form of a solid, liquid or semisolid. In the case of a solid form, it is preferred that the agent be used in the form of pulverulent body or granule. In the case of a liquid form, it is preferred that the agent be used after being dissolved in dilute hydrochloric acid, dilute sulfuric acid, water or the like. The specific gravity of the resultant solution is usually from 1.15 to 1.4. The resultant solution contains a metal sulfate and at least one of an amino acid and a salt thereof in the total amount of usually from 2% to 95% by weight, preferably from 5% to 80% by weight.

The agent of the present invention may be added to a basal electrolyte before the basal electrolyte is put into an electrolytic cell of a lead storage battery. Alternatively, the agent may be added to a basal electrolyte after the basal electrolyte is put into an electrolytic cell of lead storage battery. The basal electrolyte as used herein means a conventional electrolyte comprising dilute sulfuric acid.

With respect to the amount of the agent of the present invention to be added to the basal electrolyte, the total amount of a metal sulfate and at least one of an amino acid and a salt thereof is usually from 0.7% to 3% by weight-based on the resultant electrolyte, preferably from 1% to 2% by weight. The specific gravity of the electrolyte after the addition of the agent thereto is usually from 1.15 to 1.4, preferably from 1.25 to 1.35.

The electrolyte of the present invention means an electrolyte containing a metal sulfate and at least one of an amino acid and a salt thereof in the total amount of usually from 0.7% to 3% by weight, preferably from 1% to 2% by weight. The specific gravity of the electrolyte of the present invention is usually from 1.15 to 1.4, preferably from 1.25 to 1.35.

The electrolyte of the present invention can be obtained by adding the agent of the present invention to the basal electrolyte to make a mixture and stirring the mixture.

A lead storage battery whose function has been so lowered that it cannot supply necessary electric power can recover the original fuction by adding the agent of the present invention to a basal electrolyte of the lead storage battery or pouring an electrolyte of the present invention into an electrolytic cell of the lead storage battery. In addition, a storage battery whose function of supplying electric power is lowered immediately after the change can improve the function by adding the agent to a basal electrolyte of the lead storage battery, so that it can supply the electric power for a long term.

According to the present invention, there is provided a highly effective agent for maintaining and recovering the function of a lead storage battery whose storage capacity has been lowered, as well as an electrylyte for a lead storage battery comprising the agent and a basal electrolyte.

| |
| --- |
| Addition of Agent 1 |
| Addition of magnesium sulfate |
| Addition of vitamin C |
| Control (dilute sulfuric acid) and addition of citric acid |

Figure 2:
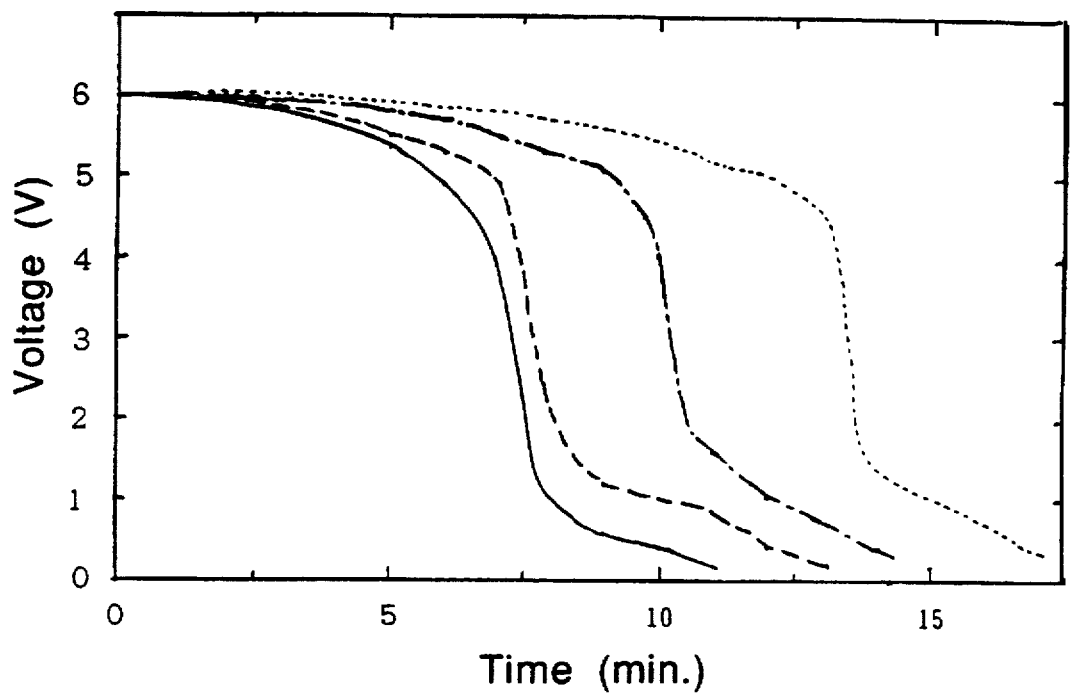

FIG. 2 is a graph showing the influence of various additives upon discharging effect of a lead storage battery.

| |
| --- |
| Addition of Agent 2 |
| Addition of aluminium sulfate |
| Addition of L-glutamic acid |
| Control (dilute sulfuric acid) and addition of magnesium carbonate |

Figure 3:
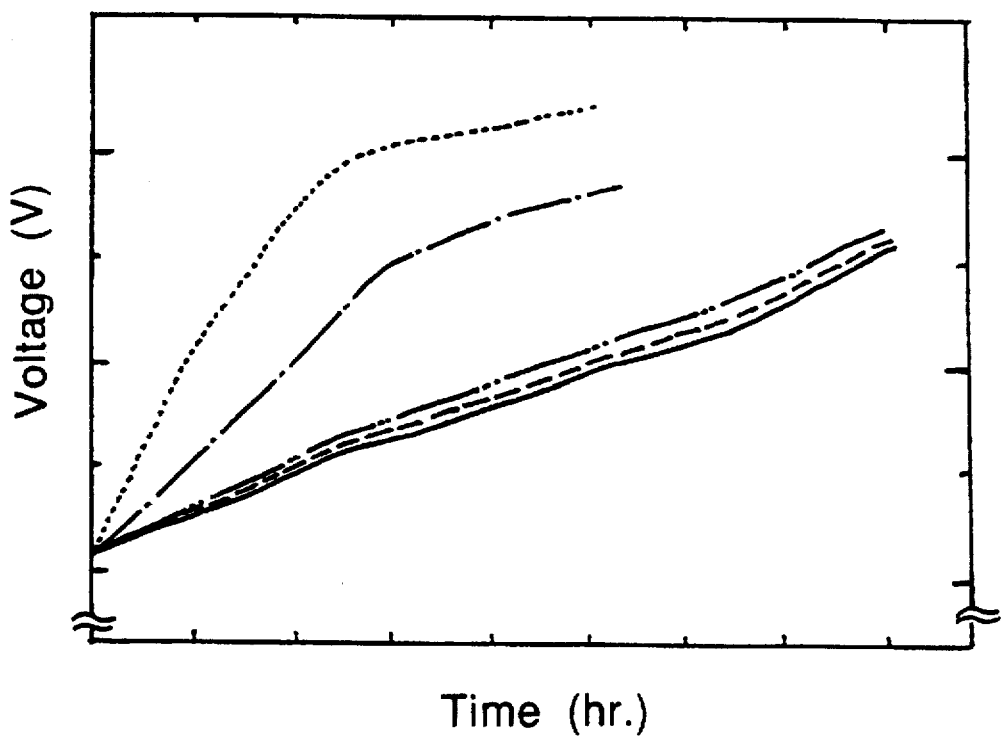

FIG. 3 is a graph showing the influence of various additives upon charging effect of a lead storage battery.

| |
| --- |
| Addition of Agent 17 |
| Addition of aluminium sulfate |
| Addition of Agent 16 |
| Addition of L-glutamic acid |
| Control (dilute sulfuric acid) and addition of magnesium carbonate, oxalic acid or germanium oxide |

Figure 4:
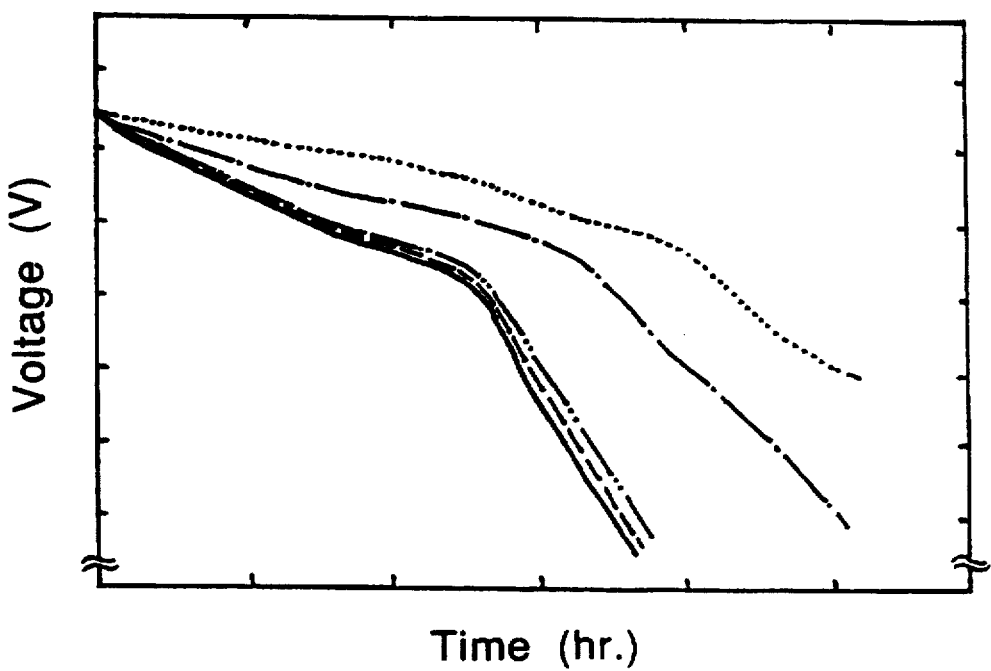

FIG. 4 is a graph showing the influence of various additives upon discharging effect of a lead storage battery.

| |
| --- |
| Addition of Agent 17 |
| Addition of aluminium sulfate |
| Addition of Agent 16 |
| Addition of L-glutamic acid |
| Control (dilute sulfuric acid) and addition of magnesium carbonate, oxalic acid or germanium oxide |

DESCRIPTION OF THE PREFERRED EMBODIMENTS

Now the present invention will be described in more detail with reference to the following Examples, which should not be construed as limiting the scope of the present invention.

EXAMPLE 1

100 g of L-glutamic acid and 100 g of magnesium sulfate were ground and mixed homogeneously in a mortar, to thereby prepare 200 g of Agent 1.

EXAMPLE 2

100 g of L-glutamic acid, 80 g of aluminium sulfate and 20 g of magnesium carbonate were ground and mixed homogeneously in a mortar, to thereby prepare 200 g of Agent 2.

EXAMPLE 3

6 g of Agent 1 was dissolved in 100 ml of 2.3 weight percent dilute sulfuric acid to thereby obtain Agent 3. The specific gravity of Agent 3 was 1.26.

EXAMPLE 4

8 g of Agent 2 was dissolved in 100 ml of 3.0 weight percent dilute sulfuric acid to thereby obtain Agent 4. The specific gravity of Agent 4 was 1.26.

EXAMPLE 5

Agent 5 was obtained in the same manner as described in Example 1 except that L-aspartic acid was used instead of L-glutamic acid.

EXAMPLE 6

Agent 6 was obtained in the same manner as described in Example 2 except that L-aspartic acid was used instead of L-glutamic acid.

EXAMPLES 7–13

Agents 7–13 were obtained in the same manner as described in Example 1 except that sodium sulfate, aluminium sulfate, cobalt sulfate, barium sulfate, manganese sulfate, iron(II) sulfate and iron(III) sulfate were used, respectively, instead of magnesium sulfate. The relation of Example No., Agent No. and the metal salt of sulfuric acid used therein is shown below.

| Example No. | Metal Sulfate | Agent No. |
| --- | --- | --- |
| 7 | Sodium sulfate | 7 |
| 8 | Aluminium sulfate | 8 |
| 9 | Cobalt sulfate | 9 |
| 10 | Barium sulfate | 10 |
| 11 | Manganese sulfate | 11 |
| 12 | Iron(II) sulfate | 12 |
| 13 | Iron(III) sulfate | 13 |

EXAMPLES 14–15

Agents 14–15 were obtained in the same manner as described in Example 2 except that sodium sulfate and magnesium sulfate were used, respectively, instead of aluminium sulfate.

EXAMPLE 16

100 g of L-glutamic acid, 70 g of aluminium sulfate, 20 g of magnesium carbonate, 9 g of oxalic acid and 1 g of germanium oxide were ground and mixed homogeneously in a mortar, to thereby prepare 200 g of Agent 16.

EXAMPLE 17

160 g of L-glutamic acid, 25 g of aluminium sulfate, 5 g of magnesium carbonate, 9 g of oxalic acid and 1 g of germanium oxide were ground and mixed homogeneously in a mortar, to thereby prepare 200 g of Agent 17.

TEST EXAMPLE 1

Addition to a Lead Storage Battery: 1

To the electrolyte of a used car battery of 6 V (Model 6Bx8-3B manufactured by Hitachi, Ltd., Japan), Agent 1, magnesium sulfate, citric acid or vitamin C was added in an amount of 10 g, respectively. (As a control, only dilute sulfuric acid was added to the electrolyte.) Then, each battery was charged with a charger (Model GS SP1-75-15A manufactured by Nippon Denchi Co., Ltd., Japan) at 6 V for 30 minutes, and discharged by lighting a tale lamp of 6 V 25 W. The battery was recharged with the charger at 6 V for 10 minutes, and then lighting experiment using a tale lamp of 6 V 25 W was conducted to examine the decrease in the voltage with the elapse of time under each of the conditions. The results are shown in FIG. 1.

Figure 1:
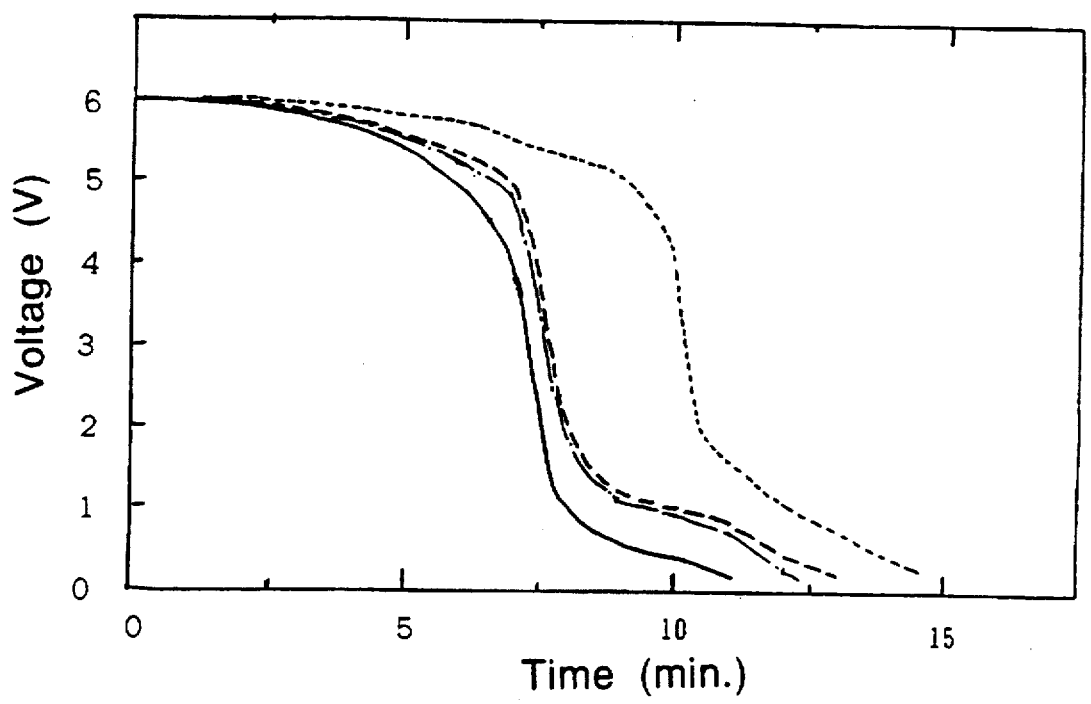
FIG. 1 is a graph showing the influence of various additives upon discharging effect of a lead storage battery.

FIG. 1 shows that the best maintaining effect on voltage of the battery was obtained when Agent 1 was added.

TEST EXAMPLE 2

Addition to a Lead Storage Battery: 2

To the electrolyte of a used car battery of 6 V (Model 6Bx8-3B manufactured by Hitachi, Ltd., Japan), Agent 2, aluminium sulfate, magnesium carbonate or L-glutamic acid was added in an amount of 10 g, respectively. (As a control, only dilute sulfuric acid was added to the electrolyte.) Then, each battery was charged with a charger (Model GS SP1-75-15A manufactured by Nippon Denchi Co., Ltd., Japan) at 6 V for 30 minutes, and discharged by lighting a tale lamp of 6 V 25 W. The battery was recharged with the charger at 6 V for 10 minutes, and then lighting experiment using a tale lamp of 6 V 25 W was conducted to examine the decrease in the voltage with the elapse of time under each of the conditions. The results are shown in FIG. 2.

FIG. 2 shows that the best maintaining effect on voltage of the battery was obtained when Agent 2 was added.

TEST EXAMPLE 3

Addition to a Lead Storage Battery: 3

To the electrolyte of a car battery of 12 V (Model 42B20R manufactured by Hitachi, Ltd., Japan), Agent 16, Agent 17, L-gultamic acid, aluminium sulfate, magnesium carbonate, oxalic acid or germanium oxide was added in an amount of 10 g, respectively. (As a control, only dilute sulfuric acid was added to the electrolyte.) Then, each battery was charged with a charger (Model PANB-24-15 manufactured by Hitachi, Ltd., Japan) at 12 V. The increase in the voltage with the elapse of time under each of the conditions was examined. The results are shown FIG. 3.

FIG. 3 shows that the high recovering effect on voltage of the battery was obtained when Agent 16 or Agent 17, respectively, was added.

TEST EXAMPLE 4

Addition to a Lead Storage Battery: 4

To the electrolyte of a car battery of 12 V (Model 42B20R manufactured by Hitachi, Ltd., Japan), Agent 16, Agent 17, L-glutamic acid, aluminium sulfate, magnesium carbonate, oxalic acid or germanium oxide was added in an amount of 10 g, respectively. (As a control, only dilute sulfuric acid was added to the electrolyte.) Then, each battery was charged with a charger (Model PANB-24-15 manufactured by Hitachi, Ltd., Japan) at 12 V for 30 minutes, and discharged by lighting a tale lamp of 12 V 50 W. The battery was recharged with the charger at 12 V for 10 minutes, and then lighting experiment using tale lamp of 12 V 50 W was conducted to examine the decrease in the voltage with the elapse of time under each of the conditions. The results are shown in FIG. 4. FIG. 4 shows that the high maintaining effect on voltage of the battery was obtained when Agent 16 or Agent 17, respectively, was added.

TEST EXAMPLE 5

A Lead Storage Battery for a Car 6 g of Agent 1 was added to each compartment of an electrolytic cell (containing 400 ml of electrolyte) of a lead storage battery (12 V 20–70 Ah) used in a car whose engine did not start well. The battery had been frequently charged since it ran down if the car was left undriven for one or two days. After the addition of Agent 1 and recharging, the start of the engine was improved and the engine of the car which had been left undriven for two days started.

TEST EXAMPLE 6

A Lead Storage Battery for a Motorcycle

A motorcycle become undrivable due to discharge of a lead storage battery (6 V 3–18 Ah) was used. In case of charging the lead storage battery in which no additive was supplemented, the engine of the motorcycle which had been left undriven did not start on the next day.

By contrast, in case of charging the lead storage battery in which 3 g of Agent 1 was added to each compartment of the electrolytic cell, the engine of the motorcycle which had been left undriven for one week started.

TEST EXAMPLE 7

A Lead Storage Battery for a Golf Cart 8 g of Agent 2, Agent 5 or Agent 6 was added to an electrolytic cell containing 600 ml of electrolyte of a lead storage battery (12 V) used in a golf cart (Model EB-65 manufactured by Furukawa Electric Co., Ltd., Japan). This golf cart driven by the battery was unable to go around a golf course even if the battery was charged everyday. After the addition of the above Agents and recharging, the golf cart which received any of the above Agents was able to go around the golf course.

TEST EXAMPLE 8

A Lead Storage Battery for a Forklift

A forklift (Model FG10 manufactured by Komatsu Ltd., Japan) become undrivable due to discharge of a lead storage battery (Model 48D26R manufactured by Hitachi, Ltd., Japan) was used.

In case of charging the lead storage battery in which no additive was supplemented, the engine of the forklift which had been left undriven for five months started but the engine which had been left undriven for more than five months did not start. By contrast, in case of charging the lead storage battery in which 5 g of Agent 7 was added to each compartment of the electrolytic cell, the engine of the forklift which had been left undriven for eight months started.

What is claimed is:

1. A method for maintaining and recovering the function of a lead storage battery, comprising the steps of combining a metal sulfate and at least one of a reactant selected from the group consisting of acidic amino acids and acidic amino acid salts, and adding this combination to an electrolyte of the battery.

2. The method according to claim 1, wherein said metal sulfate is at least one salt selected from the group consisting of sodium sulfate, magnesium sulfate, aluminum sulfate, cobalt sulfate, barium sulfate, manganese sulfate, iron (II) sulfate and iron (III) sulfate.

3. The method according to claim 1, wherein at least one reactant is selected from the group consisting of aspartic acid and glutamic acid.

4. The method according to claim 1, including adding a metal carbonate to the electrolyte.

5. The method according to claim 4, wherein said metal carbonate is magnesium carbonate.

6. An agent for maintaining and recovering the function of a lead storage battery, comprising a mixture of a metal sulfate and at least one of a reactant selected from the group consisting of acidic amino acids and acidic amino acid salts.

7. The agent of claim 6, wherein at least one reactant is selected from the group consisting of aspartic acid and glutamic acid.

8. The agent of claim 6, further containing a metal carbonate.

9. The agent of claim 8, wherein the metal carbonate is magnesium carbonate.

10. The agent of claim 6, wherein the metal sulfate is selected from the group consisting of iron (II) sulfate and iron (III) sulfate.

11. A method for maintaining and recovering the function of a lead storage battery, comprising adding the agent of claim 6 to an electrolyte of the battery.

12. A method for maintaining and recovering the function of a lead storage battery, comprising adding the agent of claim 7 to an electrolyte of the battery.

* * * * *